F. H. KROGER AND W. P. POWERS.
SPEED GOVERNOR.
APPLICATION FILED FEB. 8, 1918.

1,320,768.

Patented Nov. 4, 1919.

WITNESSES
J. Herbert Bradley.
Jo. Baily Brown

INVENTORS:
Fred H. Kroger
Walter Palmer Powers
by Fred'k W. Winter
Their attorney

UNITED STATES PATENT OFFICE.

FRED H. KROGER AND WALTER PALMER POWERS, OF BROOKLYN, NEW YORK, ASSIGNORS TO INTERNATIONAL SIGNAL COMPANY, OF PITTSBURGH, PENNSYLVANIA, A CORPORATION OF DELAWARE.

SPEED-GOVERNOR.

1,320,768.  Specification of Letters Patent.  Patented Nov. 4, 1919.

Application filed February 8, 1918. Serial No. 216,091.

*To all whom it may concern:*

Be it known that we, FRED H. KROGER and WALTER PALMER POWERS, residents of Brooklyn, in the county of Kings and State of New York, have invented a new and useful Improvement in Speed-Governors, of which the following is a specification.

This invention relates to speed governors for motors.

The object of the invention is to provide a device which will adjust the amount of steam pressure applied to a steam engine, or fuel applied to an explosive motor, or power applied to an electric motor, all of which are included in the term motors as herein used, so as to maintain the speed of the motor substantially constant, regardless of variations in the load which may be placed thereon.

Figure 1:
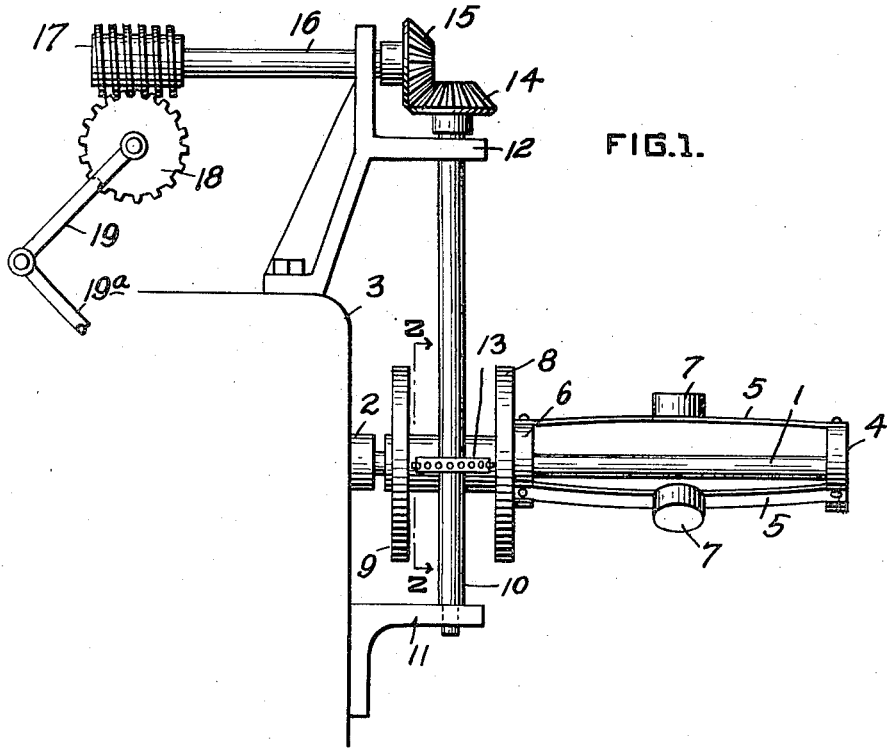
Figure 2:
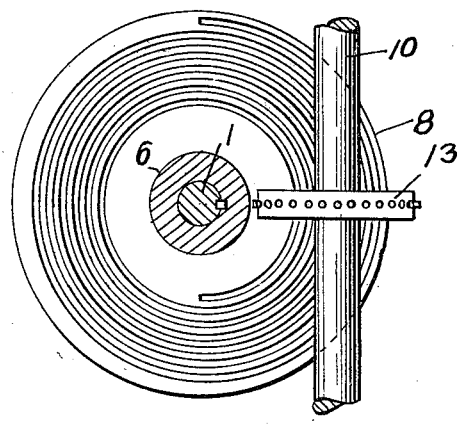

Referring to the drawings, Figure 1 shows a side elevation of the governor as applied to a motor; and Fig. 2 is an enlarged sectional view on the line 2—2 of Fig. 1.

The device consists of a shaft 1 mounted in a bearing 2, attached to a base 3, which may be any suitable support, such as the motor casing. This shaft 1 is rotated by positive connection to the engine or motor shaft, by any suitable means such as a train of gears, such means not being here illustrated.

On the outer end of the shaft is a fixed collar 4, to which are attached two or more normally straight spring members 5, having their other ends attached to a flanged member 6, slidably mounted on the shaft 1. At the middle points of the springs 5 are fixed weights 7. The slidable member 6 carries two parallel annular flanges or disks 8 and 9, the inner faces of which carry right and left hand spirals respectively, as illustrated in Fig. 2. A rotatable shaft 10 carried by bearing supports 11 and 12 extends between the flanges 8 and 9 and carries a small gear wheel 13, having teeth adapted to mesh with the spirals of flanges 8 and 9. Beyond the bearing 12 the shaft 10 carries a beveled gear 14, which engages a beveled gear 15, on a shaft 16, mounted in an extension of the bearing support 12, and carrying at its free end a worm 17, the teeth of which engage a small gear wheel 18, attached by a friction clutch to the end of a lever member 19, extending by suitable connection 19ª to the throttle, or other power controlling device of the motor.

The operation of the governor is as follows:

The springs 5 are normally straight and parallel to each other. When shaft 1 rotates, centrifugal action on weights 7 bends the springs outward, and consequently flange member 6 is drawn out along the shaft 1, until the inner face of the flange 9 comes in contact with the gear wheel 13, whereupon the spiral on the face of the flange member engages the teeth of gear wheel 13, and shaft 10 is rotated, driving worm 17 through the gears 14 and 15, and actuating the lever member 19 to shut off the power producing element driving the motor. When the throttle or other controlling device, has been sufficiently closed, the speed of rotation of the motor shaft will decrease, and consequently also that of the governor shaft 1, whereupon the weights 7 will be drawn inward by straightening out of springs 5, and the spirals on flange 9 will be thrown out of engagement with the gear 13. In this position of the governor, the throttle will rest, the condition continuing so long as the speed remains constant. However, should the speed further decrease, the inner face of flange 8 will be moved into engagement with gear 13, and the spiral on the flange 8 will engage the teeth of gear 13, driving the shaft 10 in the direction opposite to that in which it was driven by flange 9. Consequently the throttle will be opened, and more power applied to the motor, until the speed of the shaft has increased sufficiently to again draw the slidable member 6 outward to disengage the gear 13 from the spiral on flange 8. Whereupon, the governor will again be in inactive position and will not affect the power control until the speed has again increased or decreased sufficiently to slide the member 6 into engagement on one side or the other with the gear 13.

The sensitiveness of the governor may be adjusted by varying the strength of the springs 5, and the weights 7. The allowable variations of the motor speed without action of the governor may be determined by the amount of clearance left between the gear 13 and the two flanges 8 and 9.

Where the load on the motor is very suddenly changed, there will be a corresponding large change of speed of the motor, and this can not be immediately overcome by the governing device here described. However, the governor will immediately, in such cases, commence to adjust the throttle to restore the normal speed, and will continue to act until this has been done, and will so maintain the speed regardless of the load applied, so long as that load is within the maximum or minimum capacity of the motor.

We claim:

1. In a speed responsive reversible transmission device for operating the control element of a controllable machine, the combination of a rotating shaft, a centrifugally operating device carried thereby, a slidable member splined to said shaft and controlled by said centrifugal device, oppositely placed spiral faced gears on said slidable member, a transverse shaft, a gear thereon located between the oppositely placed spiral faced gears and normally out of contact with both and arranged to be engaged by either upon movement of the slidable member in either direction, and connections from said transverse shaft to the machine control element.

2. In a speed responsive reversible transmission device for operating the control element of a controllable machine, the combination of a rotating shaft, a centrifugally operating device carried thereby, a slidable member splined to said shaft and controlled by said centrifugal device, oppositely placed spiral faced gears on said slidable member, a transverse shaft, a gear thereon located between the oppositely placed spiral faced gears and provided with radial pins adapted to be engaged by the spirals on the opposite placed gears and normally out of contact with both and arranged to be engaged by either upon movement of the slidable member in either direction, and connections from said transverse shaft to the machine control element.

In testimony whereof, we have hereunto set our hands.

FRED H. KROGER.
WALTER PALMER POWERS.

Copies of this patent may be obtained for five cents each, by addressing the "Commissioner of Patents, Washington, D. C."